United States Patent [19]

Fairchild

[11] 4,379,732
[45] Apr. 12, 1983

[54] BONDING APPLICATOR FOR PRODUCING FLEXIBLE TUBING

[76] Inventor: Wayne K. Fairchild, 3623 W. Warner, Santa Ana, Calif. 92704

[21] Appl. No.: 295,666

[22] Filed: Aug. 24, 1981

[51] Int. Cl.³ .............................................. B32B 31/00
[52] U.S. Cl. .................................. 156/428; 118/321; 118/256; 118/266; 156/578
[58] Field of Search ................ 156/578, 547, 548, 195, 156/143; 118/321, 323, 681, 684, 266, 256

[56] References Cited

U.S. PATENT DOCUMENTS 3,778,327  12/1973  Fairchild ......................... 156/195 X
3,853,670  12/1974  Cox et al. ............................ 156/578

*Primary Examiner*—David A. Simmons

*Attorney, Agent, or Firm*—Francis X. LoJacono

[57] ABSTRACT

A bonding applicator adapted for use in combination with an apparatus for forming flexible tubing, whereby a continuous, reinforced, flexible tube is formed from an indefinite length of plastic tape or ribbon, together with an indefinite length of wire, which are wound and bonded together by the present bonding applicator to form a continuous tube. The bonding applicator includes a reservoir having a suitable solvent stored therein, and a supply tube connecting the reservoir to the applicator which is provided with an ON/OFF valve operated by the positioning of the applicator arm. A second flow-control valve feeds the solvent to an applicator pad which engages the bonding edges of the overlapping ribbon as it wraps around the tube-forming mandrel.

3 Claims, 3 Drawing Figures

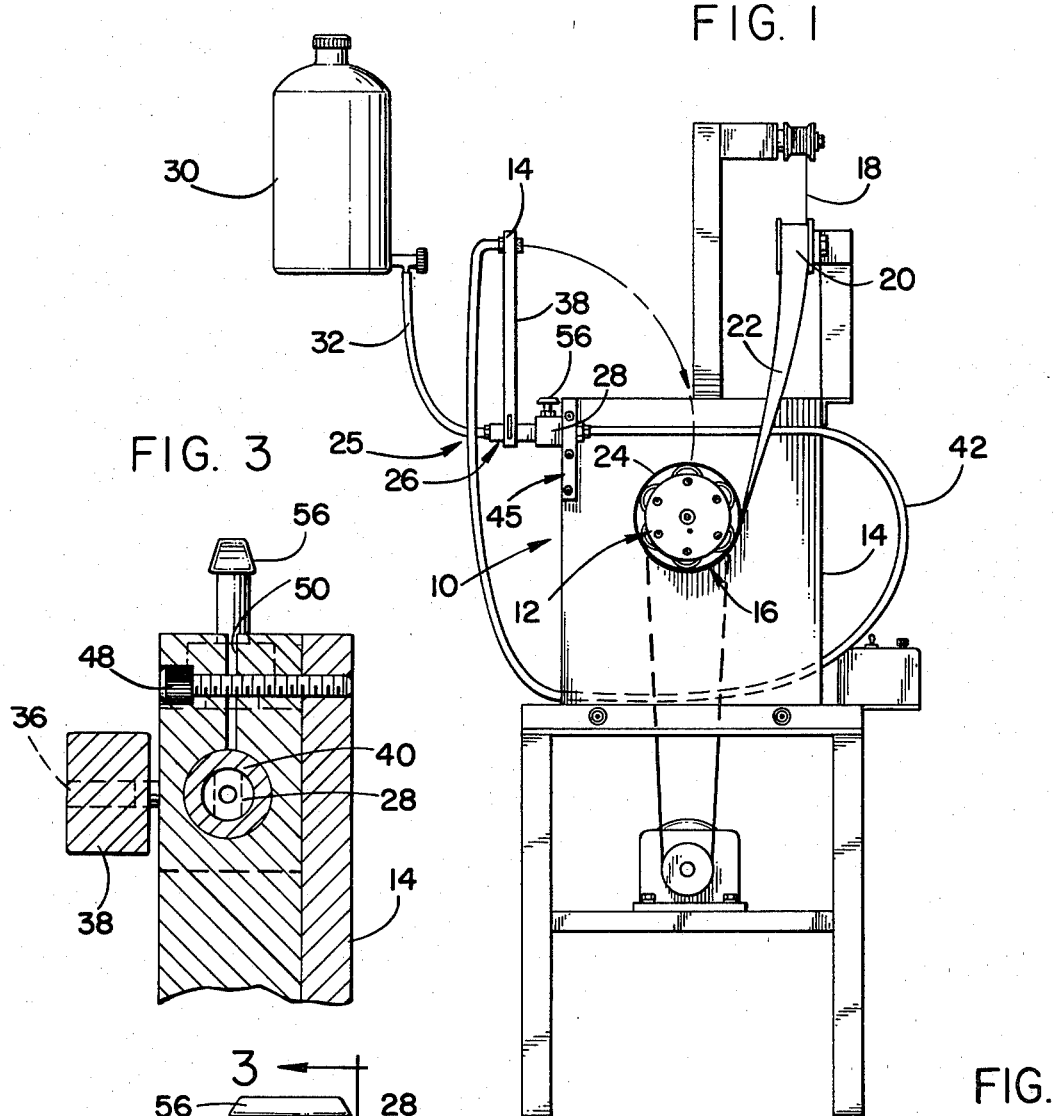
FIG. 1
FIG. 3
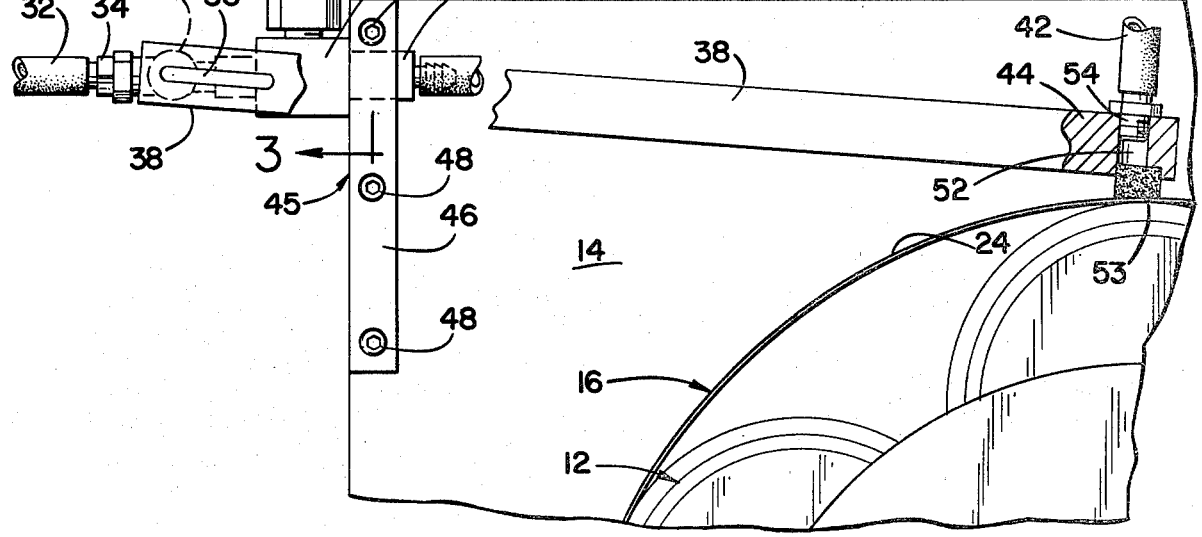
FIG. 2

BONDING APPLICATOR FOR PRODUCING FLEXIBLE TUBING

BACKGROUND OF THE INVENTION

1. Field of the Invention

This invention relates to a bonding apparatus for plastic, and more particularly to a bonding applicator for forming flexible tubing made from a continuous plastic ribbon.

2. Description of the Prior Art

It is well known in the art that various problems and difficulties are being encountered in providing suitable means for bonding a continuous plastic ribbon as it is being employed to form a continuous flexible tube or duct.

Various devices and methods have been tried but these have met with little success, since they include features that either restrict their use or make it impossible to produce a perfect uninterrupted continuous length of tubing. Some devices have been so complicated to operate that they are not compatible with the present tube-producing machines that perform at very high speeds.

SUMMARY OF THE INVENTION

The present invention has for an important object a provision wherein a bonding applicator can be installed in existing or newly developed tube-forming machines, whereby the speed of the machine in producing and forming flexible tubes or ducts will have no effect upon the operation of the applicator. That is, the present applicator—when positioned in its proper relationship with the overlapping edges of the plastic ribbon—will dispense the solvent in the proper proportions relative to the speed of the machine.

It is another object of the invention to provide a bonding applicator which includes an applicator-arm member that is connected to the main ON/OFF valve, whereby the main valve is not opened until the arm is lowered into operating position.

It is still another object of the invention to include a flow-control valve, whereby the flow of the solvent to the ribbon can be adjusted to correspond to the speed at which the ribbon is wrapped about the forming mandrel head of the machine.

It is a further object of the invention to provide an applicator of this character which includes an easily adjustable control valve.

A still further object of the present invention is to provide a device of this character which has relatively few operating parts, and is easy to service and maintain.

Still another object of the invention is to provide an applicator of this type which is relatively simple in construction and inexpensive to manufacture.

The characteristics and advantages of the invention are further sufficiently referred to in connection with the accompanyign drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCTIPTION OF THE DRAWINGS

Referring more particularly to the accompanying drawings, which are for illustrative purposes only:

FIG. 1 is a front-elevational view of a flexible-tube producing machine incorporating the present bonding applicator device, showing the applicator arm in a raised "off" position;

FIG. 2 is an enlarged elevational view of the applicator device with portions thereof broken away to better illustrate various elements thereof; and FIG. 3 is an enlarged cross-sectional view taken along line 3—3 of FIG. 2, showing how the device is mounted to the machine structure.

DESCRIPTION OF THE PREFERRED EMBODIMENT

Referring to the drawings and more particularly to FIG. 1, there is shown a flexible tube-producing machine, generally indicated at 10, having a tube-forming mandrel, generally designated at 12, which is mounted to the mandrel-support plate 14. This machine is particularly adapted for making a flexible continuous tubing, or ducting, 16 which is formed by the moving mandrel 12. The tubing 16 may be produced from a wide variety of materials. However, the tubing or ducting is formed by continuously wrapping one or more components in a spiral to form an endless length of tubing 16, which is shown being formed about mandrel 12 in FIGS. 1 and 2.

Tubing 16 as indicated represents a flexible variety and is formed by spirally wrapping a spiral strand of wire 18 together with a continuous tape or ribbon 20 consisting of a flexible vinyl material, or other similar plastic material capable of being fused together by a suitable solvent.

Ribbon 20 is wrapped around and supported by spiraled wire 18 defining a coil spring. Thus, during the tube or duct forming operation, the wire-coil spring 18 is encapsulated between the overlapping edges (indicated at 22 and 24) of ribbon 20, as they are brought together about the mandrel 12.

In order to define an integral tubular structure, ribbon 20 and wire 18 must be fastened by a suitable means, which in this case is a suitable solvent that would be appropriate for the particular plastic material used to form the flexible tubing or ducting 16.

Accordingly, the present invention provides a suitable means for applying a solvent to the overlapping turns of ribbon to join them as an integral structure with the wire interposed therebetween. Generally indicated at 25 is the bonding-applicator device, which comprises a first ON/OFF valve means 26 and a second flow-control-valve means 28. First valve means 28 is interconnected to the second flow-control-valve means, in order to allow the solvent stored in reservoir 30 to flow through the device. That is, reservoir 30 is located at a higher elevation than the valves, and when in place is connected to the first ON/OFF valve 26 by means of hose 32.

Reservoir 30 includes its own spigot 34 to which one end of hose 32 is attached, the opposite end of hose 32 being attached to the inlet 34 of valve 26. Spigot 34 is then placed in an open mode, allowing flow of solvent to first valve 26. Any suitable valve means can be provided that is a direct ON/OFF type having an extended valve stem or handle 36 to which an applicator arm member 38 can be attached, whereby the positioning of arm member 38 will cause valve 26 to open or close.

Hence, in FIG. 1 arm member 38 is shown in a substantially vertical position, whereby valve 26 is placed in a closed mode—thus preventing solvent from flowing into control valve 28.

Control valve 28 can be of any suitable type that will regulate the amount of solvent flowing from outlet 40 and into flexible hose 42, which is further connected at its opposite end to the free end 44 of arm 38.

It should be noted that a mounting means, generally indicated at 45, secures the valves to plate 14, so that when arm 38 is placed in a "down" position as seen in FIG. 2, valve 26 is positioned in an open mode. Mounting means 45 comprises a support block 46 secured to plate 14 by a plurality of screws 48, the upper end of block 46 being split at 50, thereby clamping the second valve 28 into position together with the first valve 26.

When machine 10 is turned on for operation, arm 38 is lowered to the position illustrated in FIG. 2, thus bringing a fluid-dispensing means in contact with the plastic ribbon 16. The fluid-dispensing means is mounted to the free end 44 and it comprises a bore 52 adapted to receive nipple 54 therein, one end of nipple 54 being formed to receive one end of hose 42. As the solvent fluid enters bore 52, it is absorbed by applicator pad 53 mounted therein which is in direct contact along the outer free edge 24 of ribbon 20. Thus, as the mandrel rotates, the ribbon is wound thereon and the wire 18 is encapsulated between the overlapping bonded edges 22 and 24.

Flow-control valve 28 is adjusted by valve stem 54 to provide the correct proportional volume of flow for the solvent to be dispensed with relationship to the rotational speed of the mandrel head 12.

When the machine is turned off and is no longer operating, arm 38 is raised vertically, thus closing valve 26.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A bonding-applicator device for producing flexible tubing from a continuous, substantially flat, plastic ribbon, the device comprising:
    a first valve means;
    a second valve means connected to said first valve means, wherein one of said valve means is an ON/OFF valve and said other valve means is a flow-control valve;
    a reservoir having a solvent fluid stored therein;
    means connecting said reservoir to one of said valves, wherein said connecting means comprises a hose interconnecting said reservoir with said ON/OFF valve means;
    an applicator arm having one free end and an opposite end connected to said ON/OFF valve means to cause said ON/OFF valve means to operate between an "on" and an "off" position; and
    means disposed in said free end of said applicator arm adapted to engage and apply solvent to the ribbon as the flexible tubing is being formed, said means to apply said solvent comprising:
    (a) a bore formed in said free end of said applicator arm,
    (b) a nipple secured in said bore,
    (c) a hose connecting said nipple to said flow-control valve, and
    (d) an applicator pad communicating with said bore to receive said solvent therethrough in an amount regulated by said flow-control valve;
    said ON/OFF valve means including an extended valve stem secured in said applicator arm, whereby said ON/OFF valve is placed in an "on" mode when said applicator arm is moved downwardly to allow said applicator pad to engage said ribbon, and is placed in an "off" mode when said applicator arm is arranged in a substantially vertical position;
    said flow-control-valve means including means to regulate the flow of solvent being dispensed proportionately to the speed of the moving ribbon.

2. In combination, a bonding-applicator device adapted to be employed with an apparatus for forming flexible tubing from plastic ribbon, comprising:
    an apparatus for forming flexible tubing having a tube-forming mandrel;
    a continuous, substantially flat, plastic ribbon adapted to wrap around said mandrel;
    a bonding applicator mounted to said apparatus, said applicator comprising:
    (a) a first valve means,
    (b) a second valve means connected to said first valve means, wherein one of said valve means is an ON/OFF valve and said other valve means is a flow-control valve,
    (c) a reservoir having a solvent fluid stored therein,
    (d) means connecting said reservoir to said valves,
    (e) an applicator arm having one free end and an opposite end connected to said ON/OFF valve means to operate between "on" and "off" positions, and
    (f) connecting means comprising a hose interconnecting said reservoir with said ON/OFF valve, and a second hose connecting said flow-control valve with said applicator arm;
    means disposed in said free end of said applicator arm adapted to engage and apply solvent to said plastic ribbon as said ribbon is wound about said mandrel, forming an integral flexible tubing, said means to apply said solvent comprising:
    (a) a bore formed in said free end of said applicator arm,
    (b) a nipple secured in said bore, wherein said second hose is connected thereto, and
    (c) an applicator pad attached to said arm and communicating with said bore, to receive said solvent therethrough in an amount regulated by said flow-control valve;
    said ON/OFF means including an extended valve stem secured to said applicator arm, whereby said ON/OFF valve is placed in an "on" mode when said applicator arm is moved to engage said ribbon, and is placed in an "off" mode when said applicator arm is arranged in a substantially vertical position, and wherein said flow-control-valve means includes means to regulate the flow of solvent being dispensed proportionately to the speed of the moving ribbon.

3. The combination as recited in claim 2, including means for mounting said applicator to said apparatus.

* * * * *